United States Patent
Funk et al.

(10) Patent No.: US 8,479,495 B2
(45) Date of Patent: Jul. 9, 2013

(54) ENVIRONMENTAL FACTOR BASED PARTICULATE FILTER REGENERATION

(75) Inventors: Sarah Funk, Canton, MI (US); Thomas Larose, Jr., Redford, MI (US); Eric R Snyder, Westland, MI (US); Paul Jasinkiewicz, Northville, MI (US); Jason Daniel Mullins, Howell, MI (US); James M Perrin, Livonia, MI (US)

(73) Assignee: GM Global Technology Operations LLC

( * ) Notice: Subject to any disclaimer, the term of this patent is extended or adjusted under 35 U.S.C. 154(b) by 500 days.

(21) Appl. No.: 12/396,886

(22) Filed: Mar. 3, 2009

(65) Prior Publication Data

US 2010/0223910 A1    Sep. 9, 2010

(51) Int. Cl.
*F01N 3/025* (2006.01)

(52) U.S. Cl.
USPC ............................... 60/286; 60/295

(58) Field of Classification Search
USPC ............... 60/274, 276, 285, 286, 295, 297, 60/303, 311
See application file for complete search history.

(56) References Cited

U.S. PATENT DOCUMENTS

| | | | |
|---|---|---|---|
| 6,304,815 B1 * | 10/2001 | Moraal et al. | 701/115 |
| 6,536,209 B2 * | 3/2003 | Fluga et al. | 60/284 |
| 6,957,529 B2 * | 10/2005 | Iihoshi et al. | 60/285 |
| 7,957,892 B2 * | 6/2011 | Hyde et al. | 701/115 |
| 8,015,805 B2 * | 9/2011 | Pfaeffle et al. | 60/295 |
| 2003/0213476 A1 * | 11/2003 | Joos et al. | 123/491 |
| 2004/0074225 A1 * | 4/2004 | Schaller et al. | 60/274 |
| 2006/0086083 A1 * | 4/2006 | Yacoub | 60/286 |
| 2007/0000235 A1 * | 1/2007 | Ohsaki | 60/274 |
| 2007/0068148 A1 * | 3/2007 | Kurata et al. | 60/297 |
| 2007/0271906 A1 * | 11/2007 | Berke et al. | 60/285 |
| 2009/0082938 A1 * | 3/2009 | Onodera et al. | 701/103 |

FOREIGN PATENT DOCUMENTS

| | | |
|---|---|---|
| CN | 101223347 | 7/2008 |
| DE | 19753842 A1 | 6/1999 |
| EP | 1533500 A1 | 5/2005 |
| WO | WO 2007010700 A1 * | 1/2007 |

OTHER PUBLICATIONS

Office Action dated Apr. 5, 2012 from the German Patent Office for German Patent Application No. 10 2010 008 580.4; 6 pages.

* cited by examiner

*Primary Examiner* — Thomas Denion
*Assistant Examiner* — Jonathan Matthias (57) ABSTRACT

A control module for a vehicle includes a correction module that generates a correction signal based on a regeneration state of an exhaust system of the vehicle and based on a received environmental signal. The environmental signal includes at least one of an altitude value, an ambient temperature, and an air flow value. The air flow value corresponds to air flow across an external area of the exhaust system. A first post injection module generates a first post injection signal. A second post injection module adjusts the first post injection signal based on the correction signal to generate a second post injection signal.

18 Claims, 3 Drawing Sheets

ENVIRONMENTAL FACTOR BASED PARTICULATE FILTER REGENERATION

FIELD

The present disclosure relates to engine control systems for internal combustion engines, and more particularly to particulate filter regeneration systems and fuel injection control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A combustion cycle of an engine produces particulates that are typically filtered from exhaust gas by a particulate filter (PF). The PF is disposed in an exhaust system of the engine. Over time, the PF becomes full and trapped particulates from the PF must be removed. A regeneration process is performed to remove the particulates of the PF. The regeneration process ignites the particulates to initiate an exothermic reaction within the PF. The exothermic reaction propagates along the PF.

During a combustion cycle of an engine, an air/fuel mixture is compressed and ignited within a cylinder of the engine. To facilitate regeneration, fuel may be injected into the cylinder during the combustion cycle and after ignition of the air/fuel mixture. The injected fuel, referred to as post-injected (PI) fuel, may be introduced during ignition and/or exhaust strokes of the combustion cycle. The injected fuel exits the engine with the exhaust gas and is oxidized by an oxidation catalyst disposed in the exhaust system. The heat released from the oxidation reaction in the catalyst increases the temperature of the exhaust system, which facilitates the ignition of the particulates in the PF.

The post-injection of fuel may be adjusted to maintain a predetermined exhaust gas temperature. This improves fuel economy and regeneration efficiency. As an example, the post-injection of fuel may be adjusted based on a temperature of the exhaust, which may be detected via a temperature sensor. The adjustment of the PI fuel based on the temperature of exhaust gas provides limited exhaust gas temperature control and may result in either an under-fueling or over-fueling of the PI fuel.

SUMMARY

Accordingly, a control module for a vehicle is provided and includes a correction module that generates a correction signal. The correction signal is generated based on a regeneration state of an exhaust system of the vehicle and based on a received environmental signal. The environmental signal includes at least one of an altitude value, an ambient temperature, and an air flow value. The air flow value corresponds to air flow across an external area of the exhaust system. A first post injection module generates a first post injection signal. A second post injection module adjusts the first post injection signal based on the correction signal to generate a second post injection signal.

In other features, a control module for a vehicle is provided and includes a correction module that generates a correction signal. The correction signal is generated based on a received environmental signal. The environmental signal includes at least one of an altitude value, an ambient temperature, and an air flow value. The air flow value corresponds to air flow across an external area of an exhaust system of the vehicle. A first post injection module generates a first post injection signal based on an exhaust temperature signal. A second post injection module generates a second post injection signal based on the correction signal and the first post injection signal.

In other features, a method of regenerating an exhaust system of a vehicle is provided and includes generating a regeneration enable signal based on a regeneration state of a particulate filter of the exhaust system. An environmental signal is generated based on the regeneration enable signal. The environmental signal includes at least one of an altitude value, an ambient temperature, and an air flow value. The air flow value corresponds to air flow across an external area of the exhaust system. A correction signal is generated based on the environmental signal. A first post injection signal is received and adjusted based on the correction signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present disclosure will become more fully understood from the detailed description and the accompanying drawings, wherein.

DETAILED DESCRIPTION

The following description of the preferred embodiments is merely exemplary in nature and is in no way intended to limit the invention, its application, or uses. For purposes of clarity, the same reference numbers will be used in the drawings to identify the same elements.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and/or memory (shared, dedicated, or group) that execute one or more software or firmware programs, and/or a combinational logic circuit.

In addition, although the following embodiments are described primarily with respect to example internal combustion engines, the embodiments of the present disclosure may apply to other engines. For example, the present invention may apply to compression ignition, spark ignition, spark ignition direct injection, homogenous spark ignition, homogeneous charge compression ignition, stratified spark ignition, diesel, and spark assisted compression ignition engines.

In the below-described embodiments, displacement on demand and/or cylinder deactivation may refer to the disabling of spark and/or fuel injection into a cylinder. The disabling of spark and/or fuel prevents combustion within a cylinder. The disabling of a cylinder may also or alternatively include retarding spark of a cylinder. Retarding spark refers to the delaying of spark timing such that spark for a cylinder occurs after top-dead-center (TDC).

In addition, in the following description terms, such as "first", "second", and "third" are used. These terms are not specific to any one device or element. More than one of the terms may be used to refer to the same device depending upon the context. For example, the terms first and second may be used to refer to the same post injection module.

Furthermore, various sensors and parameters are disclosed herein. The parameters may be directly determined based on signals from the corresponding sensors or may be indirectly determined. When indirectly determined, the parameters may be based on signals from non-corresponding sensors, based on determined engine and/or exhaust system operating conditions, and/or based on predetermined values. For example, air flow across an external area of an exhaust system may be directly determined via an air flow sensor or may be estimated based on information from a vehicle speed sensor and/or other sensors.

Figure 1:
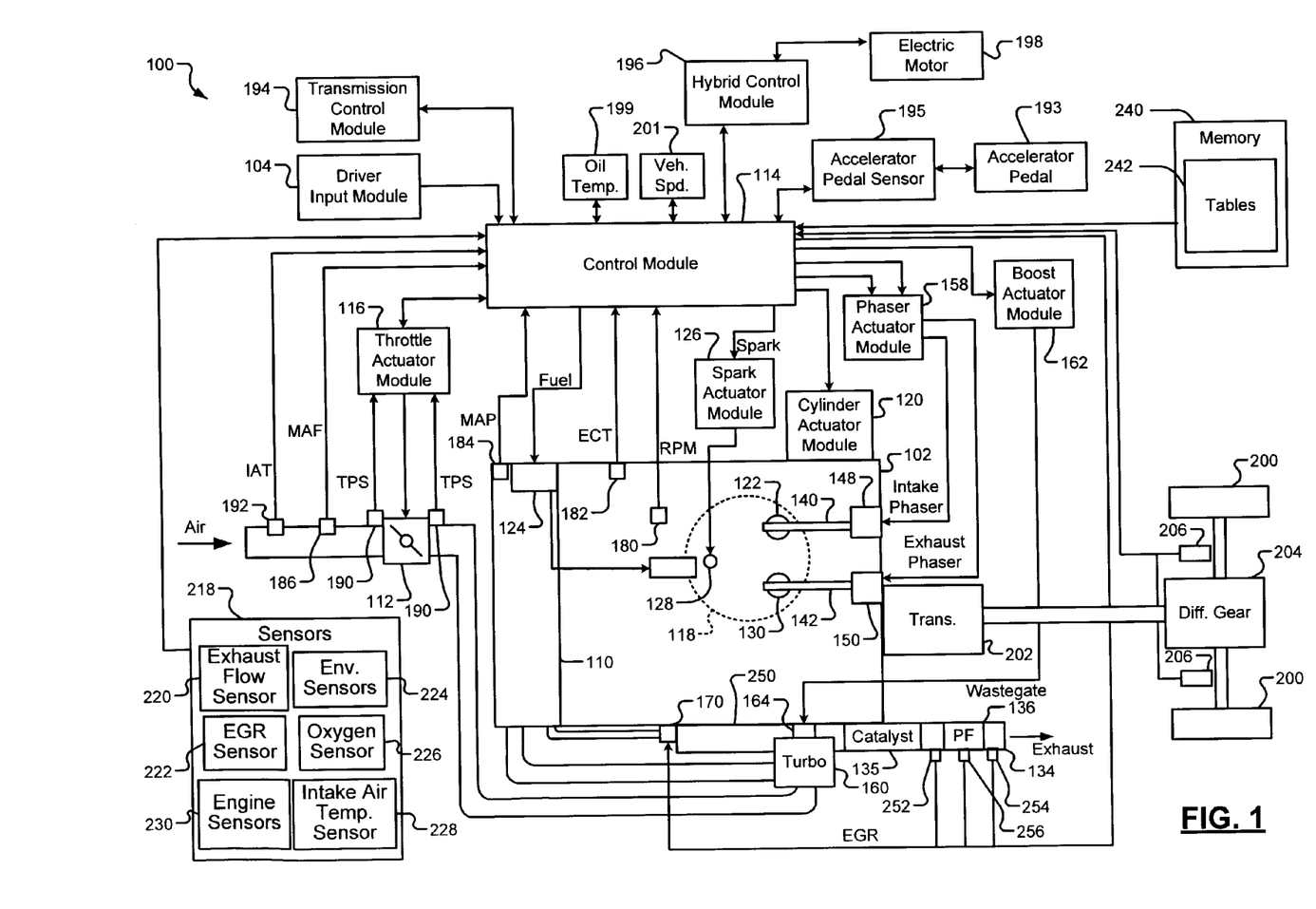
FIG. 1 is a functional block diagram of an engine system in accordance with an embodiment of the present disclosure.

Referring now to FIG. 1, an engine system 100 that incorporates post fuel injection is shown. Although the following embodiment is directed to a hybrid vehicle, the embodiments disclosed herein may be applied to non-hybrid vehicles. The engine system 100 includes an engine 102 that combusts an air/fuel mixture to produce drive torque for a vehicle based on a driver input module 104. Air is drawn into an intake manifold 110 through a throttle valve 112. A control module 114, which may be referred to as an engine control module, commands a throttle actuator module 116 to regulate opening of the throttle valve 112 to control the amount of air drawn into the intake manifold 110. The engine system 10 and/or the control module 114 may include one or more of the modules of FIG. 2.

Air from the intake manifold 110 is drawn into cylinders of the engine 102. The engine 102 may include any number of cylinders. The control module 114 may instruct a cylinder actuator module 120 to selectively deactivate some of the cylinders to improve fuel economy.

Air from the intake manifold 110 is drawn into the cylinder 118 through an intake valve 122. The control module 114 controls the amount, timing, and number of fuel injections into each cylinder of the engine 102 and during a combustion cycle via a fuel injection system 124 that includes one or more fuel injectors 125. A combustion cycle may refer to an intake stroke, a compression stroke, an ignition stroke and an exhaust stroke of a cylinder. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The fuel that is injected prior to an ignition stroke with the air and creates the air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed. The fuel (post-injected fuel) that is injected during or after an ignition stroke mixes with, for example, exhaust gas in the respective cylinder and is released into the exhaust system 134.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through an oxidation catalyst 135 and a particulate filter (PF) 136. The embodiments disclosed herein may be applied to an aftertreatment system that includes an oxidation catalyst, a particulate filter, and/or other catalyst and aftertreatment components.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A control module 114 may regulate the position of the intake valve 122 and/or the exhaust valve 130 to increase the quantity of fuel ingested into the cylinder(s) 118. The control module 114 may also adjust operation of the fuel injector(s) 125, such as ON time or size of injector openings, to increase the amount of fuel injected into the cylinder(s) 118. The control module 114 may also adjust the timing of the exhaust camshaft(s) corresponding to the change in the A/F mixture.

The time at which the intake valve 122 is opened may be varied with respect to piston TDC by an intake cam phasor 148. The time at which the exhaust valve 130 is opened may be varied with respect to piston TDC by an exhaust cam phasor 150. A phasor actuator module 158 controls the intake cam phasor 148 and the exhaust cam phasor 150 based on signals from the control module 114.

The control system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce torque during a gear shift. The control module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the control module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of spark advance. Other actuators include the boost actuator module 162, the EGR valve 170, the phasor actuator module 158, the fuel injection system 124, and the cylinder actuator module 120. The term actuator position with respect to these actuators may correspond to boost pressure, EGR valve opening, intake and exhaust cam phasor angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the control module 114. An output shaft of transmission 202 is coupled to an input of a differential gear 204. Differential gear 204 drives axles and wheels 200. Wheel speed sensors 206 generate signals that indicate a rotation speed of their respective wheels 200.

The control module 114 estimates an engine output torque to provide based on received sensor signals and other parameters described herein. The control module 114 may adjust a position of the throttle, air-fuel ratio, valve timing, fuel injection, etc. to provide the estimated engine output torque. Based on a desired engine output torque, a desired air flow, a desired fuel injection, and/or a desired spark timing is achieved. The desired engine output torque may be based on a vehicle operator (driver) request and/or may be controller based, such as a torque output request from a cruise control system. In particular, the control module 114 controls the torque output of the engine based on the coordinated torque control methods and systems of the present disclosure.

The sensor signals that are received by the control module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, and a vehicle speed sensor 201.

The control module 114 communicates with the throttle actuator module 116 and a cruise control module. The control module 114 receives a throttle position signal from the throttle position sensor 190 and adjusts throttle position based on the throttle position signal. The control module 114 may control the throttle 112 using a throttle actuator based on a position of an accelerator pedal 193. The throttle actuator module 116 may include a motor or a stepper motor, which provides limited and/or coarse control of the throttle position.

The control module 114 may also control the throttle 112 using the throttle actuator based on input from the cruise control module, such as an axle torque request. The control module 114 also generates an effective pedal position signal, which represents a throttle position regardless of whether the vehicle operator is depressing the accelerator pedal 194 or the cruise control module is controlling the amount of throttle.

Air mass, volume, and pressure per cylinder may be determined and/or estimated based on signals from the sensors 184, 186. The control module 114 may determine a throttle area based on a desired MAP and a desired MAF, and may generate a control signal to control the throttle based on the throttle area. The desired MAP and MAF may be determined based on engine speed and torque request signals.

Figure 2:
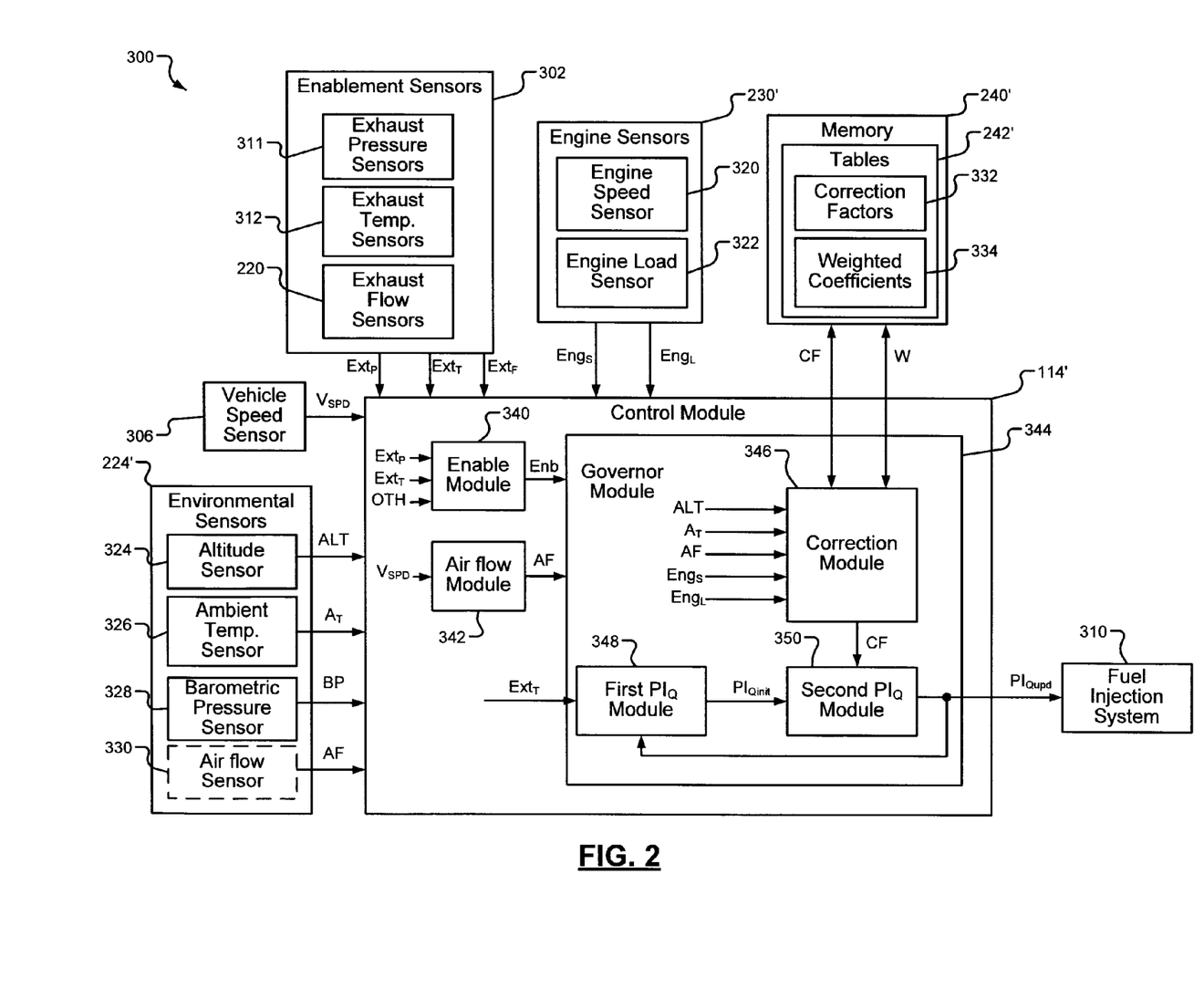
FIG. 2 is a functional block diagram of a post injection system in accordance with an embodiment of the present disclosure.

The engine system 100 may further include other sensors 218, such as exhaust flow sensors 220, an EGR sensor 222, environmental sensors 224, an oxygen sensor 226, an intake air temperature sensor 228 and engine sensors 230 not mentioned above. The environmental sensors 224 may include an altitude sensor, an ambient temperature sensor, a barometric pressure sensor, and an air flow sensor, as shown in FIG. 2. The environmental sensors 224 may be used to determine environmental conditions, which may be further used to adjust post injection of fuel and/or to determine a desired throttle area. The desired throttle area may correspond to a specific throttle position.

The engine system 10 may also include memory 240, which may be used when performing post injection of fuel and/or when performing various functions associated with the modules of the control module 114. Example modules of the control module 114 are shown and described with respect to the embodiment of FIG. 2. The memory 240 may include various tables 242, which may include predetermined exhaust temperature values, predetermined environmental condition values, correction factors, coefficient values, etc. for post injection of fuel control. The contents of the memory 240 may be associated with one or more of the steps described with respect to the embodiment of FIG. 3.

The exhaust system 134 includes an exhaust manifold 250, the oxidation catalyst 135, and the PF 136. Optionally, an EGR valve (not shown) re-circulates a portion of the exhaust back into the intake manifold 110. The remainder of the exhaust is directed into the turbocharger 160 to drive a turbine. The turbine facilitates the compression of the fresh intake air. Exhaust flows from the turbocharger 160 through the oxidation catalyst 135 and into the PF 136. The oxidation catalyst 135 oxidizes the exhaust based on a post combustion air/fuel ratio. The amount of oxidation increases the temperature of the exhaust. The PF 136 receives exhaust from the oxidation catalyst 135 and filters any soot particulates present in the exhaust. The post injection of fuel is used to heat the soot to a regeneration temperature.

A control module 114 controls the engine and regeneration of the PF 136 based on various sensed information and soot loading. More specifically, the control module 114 estimates loading of the PF 136. When the estimated loading is at a predetermined level and/or the exhaust flow rate is within a desired range, regeneration may be enabled. The duration of the regeneration process may be varied based upon the estimated amount of particulate matter within the PF 136. Post injection of fuel may be adjusted throughout the regeneration process.

The post-injected (PI) fuel and/or post-combustion air/fuel mixture is passed to and may be oxidized by the oxidation catalyst 135, which heats the PF 136. The oxidation catalyst 135 promotes oxidation of unburned fuel and raises the temperature of the exhaust gas using heat generated by an oxidation reaction. The heat may cause soot in the PF 136 to reach a point of ignition (light-off) and thus start regeneration. The ignition of the soot creates an exotherm that propagates along the PF 136 and heats soot downstream, continuing the regeneration process.

The engine system 100 may include exhaust system sensors, such as the exhaust flow sensors 220, exhaust pressure sensors 252, 254, an exhaust temperature sensor 256, etc. for determining exhaust flow levels, exhaust temperature levels, exhaust pressure levels, etc.

The PF 136 may have an associated predetermined regeneration temperature operating range, a predetermined regeneration operating temperature, and/or a predetermined peak operating temperature. The peak operating temperature may be associated with a point of potential degradation. For example, a PF may begin to breakdown at operating temperatures greater than 800° C. The peak operating temperature may vary for different PFs. The peak operating temperature may be associated with an average temperature of a portion of a PF or an average temperature of the PF as a whole.

Referring now also to FIG. 2, a functional block diagram of a post injection system 300 is shown. The post injection system 300 includes enablement sensors 302, engine sensors 230', a vehicle speed sensor 306, environmental sensors 224', memory 240', and a control module 114'. The control module 114' generates a post injection signal based on the information received from the sensors 302, 230', 306, 224' and/or from the memory 240'. The post injection signal is provided to a fuel injection system 310.

The enablement sensors 302 include exhaust pressure sensors 311 and exhaust temperature sensors 312, such as the exhaust pressure and temperature sensors 252, 254 and 256. The enablement sensors 302 also include exhaust flow sensors 220, and may include one or more of the other sensors of FIG. 1. The exhaust pressure sensors 311 generate exhaust pressure signals, designated as $Ext_P$. The exhaust temperature sensors 312 generate exhaust temperature signals, designated as $Ext_T$. The exhaust flow sensors 220 generate exhaust flow sensor signals, designated as $Ext_F$. Exhaust flow or air flow may refer to an amount of fluid (air/fuel mixture or gas) that passes through an area in a time period.

The engine sensors 230' include an engine speed sensor 320, an engine load sensor 322, and may include one or more of the other sensors of FIG. 1. The engine speed sensor 320 generates an engine speed signal $Eng_S$. The engine load sensor 322 generates an engine load signal $Eng_L$. The vehicle speed sensor 306 generates a vehicle speed signal $V_{SPD}$ that indicates speed of a corresponding vehicle.

The environmental sensors 224' may include an altitude sensor 324, an ambient temperature sensor 326, a barometric pressure sensor 328, and may include an air flow sensor 330. The altitude sensor 324 generates an altitude signal ALT. The ambient temperature sensor 326 generates an ambient temperature signal $A_T$. The barometric pressure sensor 328 generates a barometric pressure signal BP. The air flow sensor 330 may be included and may be used in replacement of or in addition to the vehicle speed sensor 306. The air flow sensor 330 generates an air flow signal AF.

The memory 240' includes tables 242', which may include correction factors 332 and weighted coefficients 334, corresponding signals are designated respectively as CF and W. The tables 242' may include environmental correction factor tables that may be engine speed and engine load based. For example, the weighted coefficients 334 may be based on engine speed and/or engine load. The correction factors 332 and weighted coefficients 334 may be generated during operation of an engine and/or regeneration of a PF and may be stored in the memory 240'. The correction factors 332 and weighted coefficients 334 may be generated based on information received from the sensors 302, 230', 306, 224'. The use of the environmental correction factors results in a stable exhaust and aftertreatment temperatures. This reduces the amount of post injection fueling adjustment needed to obtain the desired set point during regeneration and over a range of engine and exhaust system operating conditions.

The engine and exhaust system operating conditions include deposit formation and/or change in fuel vaporization, as well as other conditions disclosed herein. For example, deposit formation(s) in one or more cylinders may alter the quantity of fuel vaporized in the cylinders. Deposit formations in an oxidation catalyst may change the quantity of fuel oxidized. In addition, a change in fuel vaporization in one or more of the cylinders may result in the accumulation of residual fuel. The post injection of fuel may be adjusted based on the change in fuel vaporization and/or the amount of deposit formation. The post injection of fuel is adjusted to stabilize temperatures of the engine and/or the exhaust system including the PF.

The control module 114' includes an enable module 340, an air flow module 342, and a governor module 344. The enable module 340 generates an enable status signal Enb based on the exhaust pressure signals $Ext_P$, the exhaust temperature signals $Ext_T$, and other enable signal inputs, such as the exhaust flow signals $Ext_F$. The air flow module 342 generates an air flow signal AF' based on the vehicle speed signal $V_{SPD}$. The air flow module 342 may estimate the air flow across and adjacent to an area that is external to the exhaust system based on the vehicle speed $V_{SPD}$. The air flow signal represents air flow across the outside of the exhaust system. This indicates external cooling of the exhaust system.

The governor module 344 limits peak temperature of a PF and/or a peak temperature of an exhaust gas to less than or equal to a predetermined temperature. The governor module 344 limits the peak temperatures by adjusting post injection quantities within cylinders of an engine and/or within an exhaust system. The post injection quantities are adjusted to maintain the exhaust system and/or exhaust gas within a predetermined operating range and/or at a predetermined temperature or desired set point. This increases robustness of a PF. The post injection quantities are adjusted based on environmental parameters as well as various engine parameters and conditions as disclosed herein. This prevents under and/or over fueling during post injection.

The governor module 344 includes a correction module 346, a first post injection module 348, and a second post injection module 350. The correction module 346 generates a correction factor, which may be stored in the memory, based on signals from the sensors 302, 230', 306, 224' and from the modules 340, 342. As shown, the correction module 346 generates the correction factor CF based on the altitude signal ALT, the ambient temperature signal $A_T$, the air flow signal AF, the barometric pressure signal BP, the engine speed signal $Eng_S$, and the engine load signal $Eng_L$.

The first post injection module 348 generates a first post injection signal $PI_{Qinit}$ based on the exhaust temperature signal $Ext_T$. The second post injection module 350 generates a second post injection signal (current or adjusted post injection signal) $PI_{Qupd}$ based on the correction signal CF and the first post injection signal $PI_{Qinit}$. The second post injection signal $PI_{Qupd}$ may be provided to the fuel injection system 310 to control one or more fuel injectors.

The enable module 340 may enable regeneration based on soot loading. This prevents damaging a PF and thus increases the operating life of the PF. A desired predetermined operating temperature and target maximum operating temperature may be set for the PF. Regeneration is performed when soot loading is less than or equal to a soot loading level associated with the desired predetermined operating temperature and/or the maximum operating temperature. The regeneration may be performed when soot loading levels are low or within a predetermined range. The predetermined range has an upper soot loading threshold $S_{ut}$ that may be associated with the maximum operating temperature. Limiting peak operating temperatures of the PF minimizes pressures in and expansion of the PF. In one embodiment, soot loading is estimated and regeneration is performed based thereon. In another embodiment, when soot loading is greater than desired for regeneration, mitigation strategies may be performed to reduce PF peak temperatures during regeneration.

Soot loading may be estimated from parameters, such as mileage, exhaust pressure, exhaust drop off pressure across a PF, by a predictive method, etc. Mileage refers to vehicle mileage, which approximately corresponds to or can be used to estimate vehicle engine operating time and/or the amount of exhaust gas generated. As an example, regeneration may be performed when a vehicle has traveled approximately 200-300 miles. The amount of soot generated depends upon vehicle operation over time. At idle speeds less soot is generated than when operating at travel speeds. The amount of exhaust gas generated is related to the state of soot loading in the PF.

Exhaust pressure can be used to estimate the amount of exhaust generated over a period of time. When an exhaust pressure exceeds a predetermined level or when an exhaust pressure decreases below a predetermined level, regeneration may be performed. For example when exhaust pressure entering a PF exceeds a predetermined level, regeneration may be performed. As another example when exhaust pressure exiting a PF is below a predetermined level, regeneration may be performed.

Exhaust drop off pressure may be used to estimate the amount of soot in a PF. For example, as the drop off pressure increases the amount of soot loading increases. The exhaust drop off pressure may be determined by determining pressure of exhaust entering a PF minus pressure of exhaust exiting the PF. This may be done using pressure signals from the exhaust pressure sensors 311.

A predictive method may include the determination of one or more engine operating conditions, such as engine load, fueling schemes, fuel injection timing, and exhaust gas recirculation (EGR). A cumulative weighting factor for engine regeneration enablement may be used based on the engine conditions. The cumulative weighting factor is related to soot loading. When the cumulative weighting factor exceeds a threshold, regeneration may be performed.

Based on the estimated soot loading and a known peak operating temperature for a PM filter, regeneration is performed to prevent the PM filter from operating at temperatures above the peak operating temperature.

Designing a control system to target a selected soot loading allows PF regenerations without intrusive controls. A robust regeneration strategy as provided herein that removes soot from a PF while limiting peak operating temperatures of the PF. Limiting of peak operating temperatures reduces thermal stresses on a substrate of a PF and thus prevents damage to the PF, which can be caused by high soot exotherms.

When soot loading is greater than a threshold level associated with a set peak regeneration temperature, mitigation strategies may be performed to reduce PF peak temperatures during regeneration. For example, when a maximum soot loading threshold is set at approximately 2 g/l and current soot loading is 4 g/l, to minimize temperatures within a PM filter during regeneration post injection may be reduced and/or engine operation may be adjusted. The adjustment may include oxygen control and exhaust flow control.

Soot loading may be greater than an upper threshold level, for example, when an engine is operated to receive a high intake air flow rate for an extended period of time. Such operation may occur on a long freeway entrance ramp or during acceleration on a freeway. As another example, a soot loading upper threshold may be exceeded when throttle of an engine is continuously actuated between full ON and full OFF for an extended period of time. High air flow rates can prevent or limit regeneration of a PF.

During oxygen control, the amount of oxygen entering the PM filter is decreased to decrease the exotherm temperatures of the PF during regeneration. To decrease oxygen levels airflow may be decreased, EGR may be increased, and/or fuel injection may be increased. The fuel injection may be increased within engine cylinders and/or into the associated exhaust system. The burning of more fuel decreases the amount of oxygen present in the exhaust system.

A large increase in exhaust flow can aid in distinguishing or minimizing an exothermic reaction in a PF. Exhaust flow control may include an increase in exhaust flow by a downshift in a transmission or by an increase in idle speed. The increase in engine speed increases the amount of exhaust flow.

The fuel injection system 310 may include fuel injectors that inject fuel into cylinders of an engine. The fuel injection system may also include a fuel injector that injects fuel into, for example, the exhaust system 134.

Figure 3:
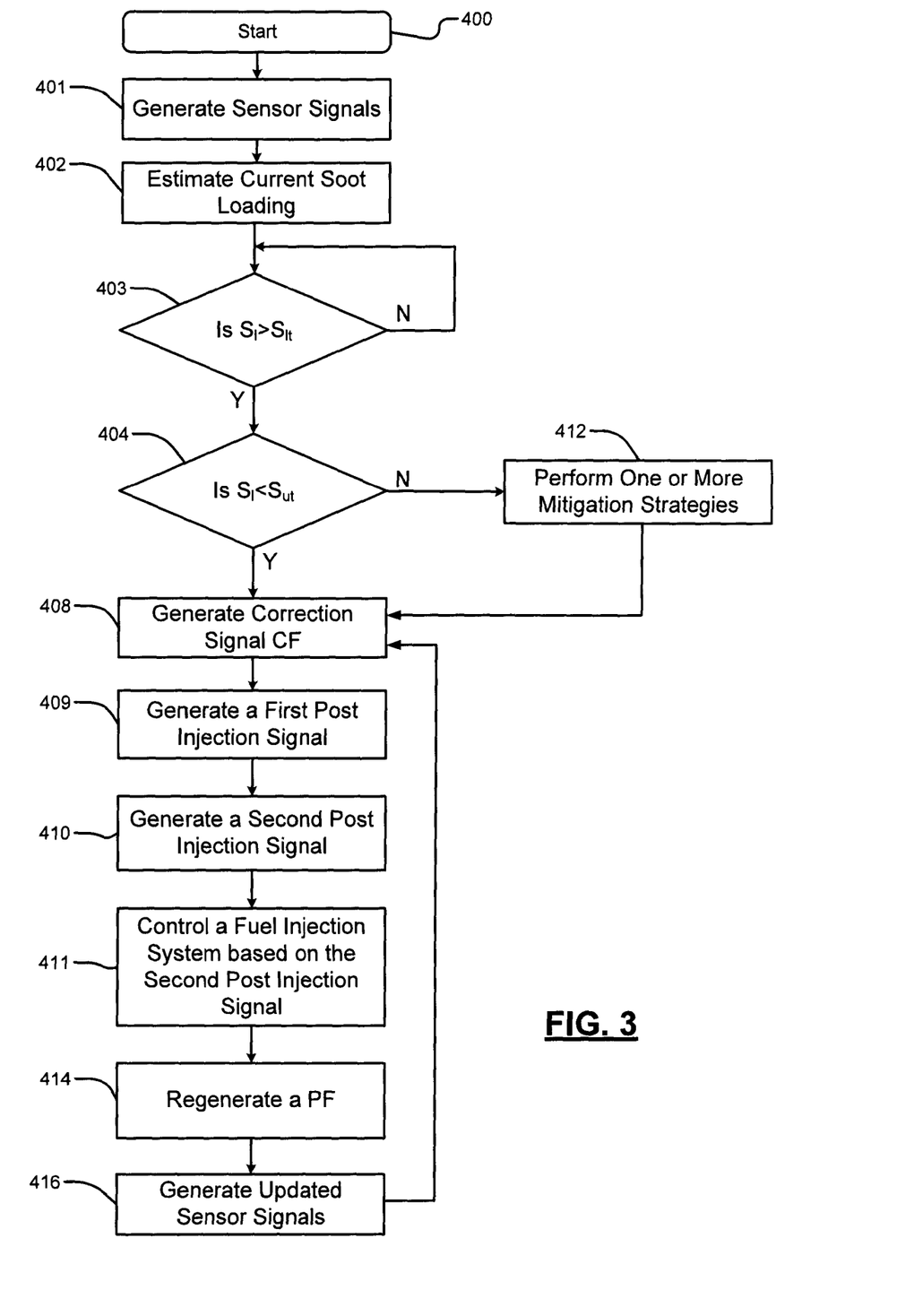
FIG. 3 illustrates a method of controlling post injection during regeneration of a particulate filter in accordance with an embodiment of the present disclosure.

Referring now to FIG. 3, a method of controlling post injection during regeneration of a PF is shown. Although the following steps are described with respect to the embodiments of FIGS. 1 and 2, they may be applied to other embodiments of the present disclosure. The method may begin at step 400.

In step 401, sensor signals are generated. The sensor signals may include the signals generated by the sensors 302, 230', 306, 224' of FIG. 2, as well as signals generated by other sensors, such as those of FIG. 1. For example, the other sensor signals may include an oxygen signal, an intake air flow signal, an intake air pressure signal, an intake air temperature signal, an EGR signal, etc.

In step 402, control of the enable module 340 estimates a current soot loading $S_l$ of the PF. Control may estimate soot loading as described above. The estimation may be based on vehicle mileage, exhaust pressure, exhaust drop off pressure across the PF, and/or a predictive method. The predictive method may include estimation based on one or more engine operating parameters, such as engine load, fueling schemes, fuel injection timing, and EGR. In step 403, control determines whether the current soot loading $S_l$ is greater than a soot loading lower threshold $S_{lt}$. When the current soot loading $S_l$ is greater than the lower threshold $S_{lt}$ control proceeds to step 404, otherwise control returns to step 402.

In step 404, control determines whether current soot loading $S_l$ is less than a soot loading upper threshold $S_{ut}$. When the current soot loading $S_l$ is less than the upper threshold $S_{ut}$ then control proceeds to step 408. When the current soot loading $S_l$ is greater than or equal to the upper threshold $S_{ut}$ then control proceeds to both steps 408 and 412. In step 412, control, of for example the control module 114, performs mitigation strategies as described above to limit peak temperatures in the PF during regeneration. The mitigation strategies may include the reduction in a post injection amount or signal, such as, a reduction in the second post injection signal $PI_{Qupd}$.

The following steps 408-416 are iteratively performed. If control determines that regeneration is needed in step 404, control generates the correction signal CF in step 408. The correction signal is generated based on the sensor signals.

In step 409, control of the first post injection module 348 generates the first post injection signal $PI_{Qinit}$. The first post injection signal $PI_{Qinit}$ is generated based on the exhaust temperature signal $Ext_T$ and/or the second post injection signal $PI_{Qupd}$, which may be feed back to the first post injection module 348. The first post injection signal $PI_{Qinit}$ may be based on expression 1 or 2. Initially equation 1 may be used. After an iteration of, for example, steps 408-416 have been performed, equation 2 may be used. During regeneration the first and second post injection signals $PI_{Qinit}$ and $PI_{Qupd}$ may be generated based on predetermined environmental values, measured values, or indirectly determined values for ambient temperature, altitude, barometric pressure, air flow, engine speed, vehicle speed, engine load, etc. As an example, the altitude and air flow around an exhaust system or aftertreatment system may be estimated based on barometric pressure and vehicle speed.

$$PI_{Qinit}=F\{E_T\} \tag{1}$$

$$PI_{Qinit}=F\{E_T, PI_{Qupd}\} \tag{2}$$

In step 410, control of the second post injection module 350 generates the second post injection signal $PI_{Qupd}$ based on the correction signal and the first post injection signal $PI_{Qinit}$. The second post injection signal $PI_{Qupd}$ may be generated, for example, based on one of expressions 3-6, where $c_1, c_2, c_3,$ and $c_4$ are weighted coefficient values that may be predetermined and stored in memory. The weighted coefficient values may be based on the engine speed $Eng_S$ and the engine load $Eng_L$.

$$[c_1 ALT + c_2 A_T + c_3 AF][PI_{Qinit}] = PI_{Qupd} \tag{3}$$

$$[c_1 ALT + c_2 A_T + c_3 AF + c_4 BP][PI_{Qinit}] = PI_{Qupd} \tag{4}$$

$$[c_1 ALT + c_2 A_T + c_3 V_{SPD}][PI_{Qinit}] = PI_{Qupd} \tag{5}$$

$$[c_1 ALT + c_2 A_T + c_3 V_{SPD} + c_4 BP][PI_{Qinit}] = PI_{Qupd} \tag{6}$$

In step 411, a fuel injection system, such as the fuel injection system 310, may be controlled based on the second post injection signal $PI_{Qupd}$ to provide post injected fuel in cylinders of the engine and/or in the exhaust system.

In step 414, the PF is regenerated based on the post injected fuel. The post injected fuel is oxidized by a catalyst and generates heat, which may initiate and/or be used to control the regeneration process. The regeneration process may be initiated using other techniques, such as using electrically heated elements within the PF to control heating of one or more zones of the PF. The initiation may include heating the PF based on conduction, convection, microwave energy, etc. When initiated, burning soot cascades down the PM filter, which is similar to a burning fuse on a firework. PF heating techniques other than post injection control may be disabled once regeneration begins.

In step 416, updated sensor signals may be generated. The sensor signals may include the signals generated by the sensors 302, 230', 306, 224' of FIG. 2, as well as signals generated by other sensors, such as those of FIG. 1.

In use, the control module and/or enable module determines when the PF requires regeneration. The determination is based on soot levels within the PF. Alternately, regeneration can be performed periodically or on an event basis. The control module and/or enable module may estimate when the entire PF needs regeneration or when zones within the PF need regeneration. When the entire PF needs regeneration, one or more zones of the PF may be sequentially activated at a time to initiate regeneration within the associated downstream portion of the PF. After the zone or zones are regenerated, one or more other zones are activated while the others are deactivated. This approach continues until all of the zones have been activated. When one of the zones needs regeneration, the zone corresponding to the associated downstream portion of the PF needing regeneration may be activated.

The above-described steps of FIG. 3 are meant to be illustrative examples; the steps may be performed sequentially, synchronously, simultaneously, continuously, during overlapping time periods or in a different order depending upon the application.

The introduction of environmental correction factors in post fuel injection control increases stability of PF regeneration temperature control and provides a robust fuel injection control technique. This results in improved fuel economy and emissions performance. The disclosed embodiments reduce aftertreatment system degradation over time and improve aftertreatment hardware durability.

Those skilled in the art may now appreciate from the foregoing description that the broad teachings of the present disclosure may be implemented in a variety of forms. Therefore, while this disclosure includes particular examples, the true scope of the disclosure should not be so limited, since other modifications will become apparent to the skilled practitioner upon a study of the drawings, the specification and the following claims.

What is claimed is:

1. A control module for a vehicle comprising:
a correction module that generates a correction signal based on a regeneration state of an exhaust system of the vehicle and based on a received environmental signal, wherein the received environmental signal includes an air flow value that indicates a flow rate of air across an external area of the exhaust system;
a first post injection module that generates a first post injection signal; and
a second post injection module that adjusts the first post injection signal based on the correction signal to generate a second post injection signal,
wherein the second post injection signal is fed back to the first post injection module; and
wherein the first post injection module generates the first post injection signal based on the second post injection signal.

2. The control module of claim 1 wherein the second post injection module adjusts the first post injection signal based on the correction signal to maintain an exhaust temperature of the exhaust system within a predetermined temperature range.

3. The control module of claim 1 wherein the first post injection module generates the first post injection signal based on the second post injection signal.

4. The control module of claim 1 further comprising an air flow module that generates the air flow value based on a speed of the vehicle.

5. The control module of claim 1 wherein the correction signal is generated based on at least one of an engine speed and an engine load.

6. A system comprising the control module of claim 5 and further comprising an engine speed sensor that generates an engine speed signal,
wherein the engine speed is determined based on the engine speed signal.

7. The control module of claim 1 wherein:
the environmental signal includes an altitude value and an ambient temperature; and
the correction signal includes the altitude value, the ambient temperature, and the air flow value.

8. The control module of claim 7 wherein:
the correction signal is generated based on a weighted summation of the altitude value, the ambient temperature and the air flow value; and
the second post injection module generates the second post injection signal by multiplying the first post injection signal by the weighted summation.

9. The control module of claim 7, wherein the correction signal includes a barometric pressure.

10. The control module of claim 9 wherein:
the correction signal is generated based on a weighted summation of the altitude value, the ambient temperature, the air flow value, and the barometric pressure; and
the second post injection module generates the second post injection signal by multiplying the first post injection signal by the weighted summation.

11. A system comprising the control module of claim 1 and further comprising an altitude sensor, an ambient temperature sensor, and a vehicle speed sensor that generate sensor signals,
wherein the correction module generates the correction signal based on the sensor signals.

12. The control module of claim 1 further comprising an enable module that generates a regeneration enable signal based on at least one of an exhaust temperature signal and an exhaust pressure signal,
wherein the first post injection module generates the first post injection signal based on
a regeneration status of a particulate filter of the exhaust system, and
the regeneration enable signal.

13. A system comprising the control module of claim 1 and further comprising a fuel injection system that injects fuel into a cylinder of an engine based on the second post injection signal.

14. The control module of claim 1 wherein the correction module generates the correction signal when regeneration of the exhaust system is enabled.

15. A control module for a vehicle comprising:
a correction module that generates a correction signal based on a received environmental signal that includes at least one of
an altitude, and
an air flow value that indicates a flow rate of air across an external area of an exhaust system of the vehicle;
a first post injection module that generates a first post injection signal based on an exhaust temperature signal; and
a second post injection module that generates a second post injection signal based on the correction signal and the first post injection signal,
wherein the second post injection module generates the second post injection signal based on the correction signal to maintain an exhaust temperature of the exhaust system within a predetermined temperature range during regeneration of the exhaust system,
wherein the second post injection signal is fed back to the first post injection module; and
wherein the first post injection module generates the first post injection signal based on the second post injection signal.

16. A system comprising the control module of claim 15 and further comprising a fuel injection system that injects fuel into a cylinder of an engine based on the second post injection signal.

17. A method of regenerating an exhaust system of a vehicle comprising:
generating a regeneration enable signal based on a regeneration state of a particulate filter of the exhaust system;
generating an environmental signal based on the regeneration enable signal, wherein the environmental signal includes
an altitude,
an ambient temperature, and
an air flow value that indicates a flow rate of air across an external area of the exhaust system;
generating a correction signal based on the environmental signal, an engine speed and an engine load;
receiving and adjusting a first post injection signal based on the correction signal to generate a second post injection signal;
feeding back the second post injection signal to generate the first post injection signal; and
generating the first post injection signal based on the second post injection signal.

18. The method of claim 17 wherein the first post injection signal is generated based on an exhaust temperature signal.

* * * * *

UNITED STATES PATENT AND TRADEMARK OFFICE
CERTIFICATE OF CORRECTION

| | | |
|---|---|---|
| PATENT NO. | : 8,479,495 B2 | Page 1 of 1 |
| APPLICATION NO. | : 12/396886 | |
| DATED | : July 9, 2013 | |
| INVENTOR(S) | : Funk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this
Thirtieth Day of December, 2014

Michelle K. Lee
*Deputy Director of the United States Patent and Trademark Office*